E. BUTLER.
Assignor to MOSER & LYON.
Slate-Frame.
No. 8,588. Reissued Feb. 18, 1879.
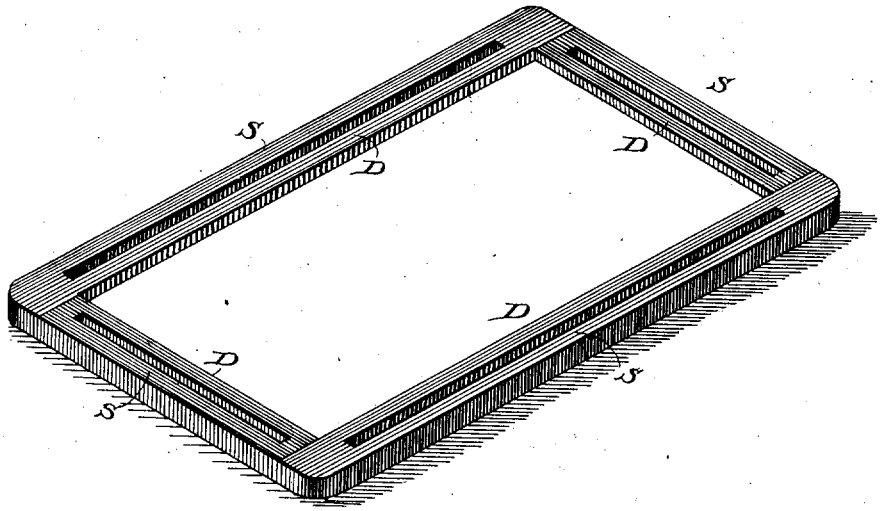
Witnesses:
E. P. Howe
E. Bethwaite Jr.
Inventor:
E. Butler.
N. PETERS, PHOTO-LITHOGRAPHER, WASHINGTON, D. C.

UNITED STATES PATENT OFFICE.

EBENEZER BUTLER, OF SALINA, ASSIGNOR TO MOSER & LYON, OF SYRACUSE, NEW YORK.

IMPROVEMENT IN SLATE-FRAMES.

Specification forming part of Letters Patent No. 99,756, dated February 15, 1870; Reissue No. 8,588, dated February 18, 1879; application filed October 26, 1878.

*To all whom it may concern:*

Be it known that I, EBENEZER BUTLER, of Salina, Onondaga county, New York, have invented a certain Improvement in Slate-Frames, of which the following is a specification:

This invention consists in a certain construction of slate-frames, as hereinafter described in detail and shown in the drawing, by which a ready and convenient mode of covering their outer edges with list, cloth, or other proper material is effected, and by which the application of said material to the edges of the slate-frame is more neatly and perfectly made, and the corners and edges of the frame can be more entirely covered, to afford protection against noise, &c., when brought into contact with a desk or other hard substance, more perfectly than anything heretofore essayed.

The former devices heretofore essayed consisted, so far as I am informed, of narrow rings or strips of india-rubber or other material attached at different points on the frame, leaving the greater part of the edges of the frame exposed between them, whereas in my device the whole of the outer edges can be entirely covered.

In the accompanying drawing a perspective view of the slate-frame is shown, the covering being omitted, and in this form the frame may be sold, if desired, to the purchasers, who can apply list or other covering, of such material or color as may suit their individual fancies.

In the drawing, D D represents an ordinary school-slate frame, along the sides and ends of which channels or slots are formed, parallel with and at a proper distance from the edge, and extending nearly from end to end of the side and end pieces of the frame, leaving only a space sufficient for the union of the edge-strip and the frame, thus forming a rail or bar around the outer edge of the frame, by means of which a strip of list, cloth, or other suitable material, covering the sides, ends, and corners, may be readily and perfectly secured in place, and form a protection to the entire edge of the frame.

I disclaim the use of short slots or holes in a slate-frame for the insertion of rubber or other material at one or more points on the sides of a slate-frame or on its corners, the same having before been done, my device being continuous bars or rails, with spaces or channels between them and the inner part of the frame, extending so nearly the whole length of the ends and sides of the edge that the entire edge of the frame can be covered with the protecting material.

Having thus fully described and set forth my improvement for protecting the edges of slate-frames, I claim as new—

A slate-frame upon the outer edge of each side or section of which is a rail or bar, forming a slot or opening between the frame and bar, from end to end thereof, having sufficient points of attachment, substantially in the manner described, and for the purpose of securing around the edges of the frame a covering of list or other material, substantially as and for the purposes specified.

EBENEZER BUTLER.

Witnesses:

I. M. GUY,

H. W. DICKINSON.